United States Patent
Tsuchiya et al.

(10) Patent No.: US 7,932,686 B2
(45) Date of Patent: Apr. 26, 2011

(54) DRIVE DEVICE, HYBRID VEHICLE EQUIPPED WITH THE DRIVE DEVICE, AND CONTROL METHOD FOR DRIVE DEVICE

(75) Inventors: Kazuya Tsuchiya, Toyota (JP); Tomohiko Miyamoto, Nishikamo-gun (JP); Hiroshi Yoshida, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 261 days.

(21) Appl. No.: 12/382,850

(22) Filed: Mar. 25, 2009

(65) Prior Publication Data
US 2009/0261762 A1 Oct. 22, 2009

(30) Foreign Application Priority Data

Apr. 16, 2008 (JP) ................... 2008-106975

(51) Int. Cl.
*H02P 27/00* (2006.01)
*B60K 1/00* (2006.01)

(52) U.S. Cl. ..................... 318/400.3; 318/662; 318/440; 180/65.1; 180/65.21; 180/65.29

(58) Field of Classification Search ............... 318/400.3, 318/662, 440; 180/65.1, 65.21, 65.25, 65.29; 307/9.1, 10.3, 10.6, 66, 132 E, 132 EA
See application file for complete search history.

(56) References Cited

U.S. PATENT DOCUMENTS

| | | | | |
|---|---|---|---|---|
| 5,568,025 A * | 10/1996 | Sumida et al. | ................ | 318/287 |
| 6,278,254 B1 * | 8/2001 | Harkey | ......................... | 318/778 |
| 6,966,803 B2 * | 11/2005 | Hara et al. | ........................ | 440/6 |
| 7,847,499 B2 * | 12/2010 | Nakamura et al. | ....... | 318/400.27 |
| 7,854,142 B2 * | 12/2010 | Hatano et al. | ................... | 62/510 |

FOREIGN PATENT DOCUMENTS

| | | |
|---|---|---|
| JP | A-7-312831 | 11/1995 |
| JP | A-2000-40536 | 2/2000 |
| JP | A-2002-142373 | 5/2002 |
| JP | A-2007-259645 | 10/2007 |
| JP | A-2008-5658 | 1/2008 |
| JP | A-2008-17560 | 1/2008 |

OTHER PUBLICATIONS

Jan. 27, 2010 Office Action issued in Japanese Patent Application No. 2008-106975 (with translation).

* cited by examiner

*Primary Examiner* — Walter Benson
*Assistant Examiner* — Thai Dinh
(74) *Attorney, Agent, or Firm* — Oliff & Berridge, PLC

(57) ABSTRACT

A drive device having at least one electric motor that inputs and outputs motive power includes: a plurality of capacitors; a plurality of relays for capacitors that connects and disconnects the motor and the capacitors; and a relay control device that controls the relays for capacitors. The relay control device controls the plurality of relays for capacitors so that during a system start-up, a part of the plurality of relays for capacitors are connected, that is, a partially-on-state is established, after a first predetermined condition is satisfied during the partially-on-state, the part of relays for capacitors are disconnected and a remaining part of the plurality of relays for capacitors are connected, and after a second predetermined condition is satisfied during the remainder-on-state, all the plurality of relays for capacitors are connected.

5 Claims, 4 Drawing Sheets

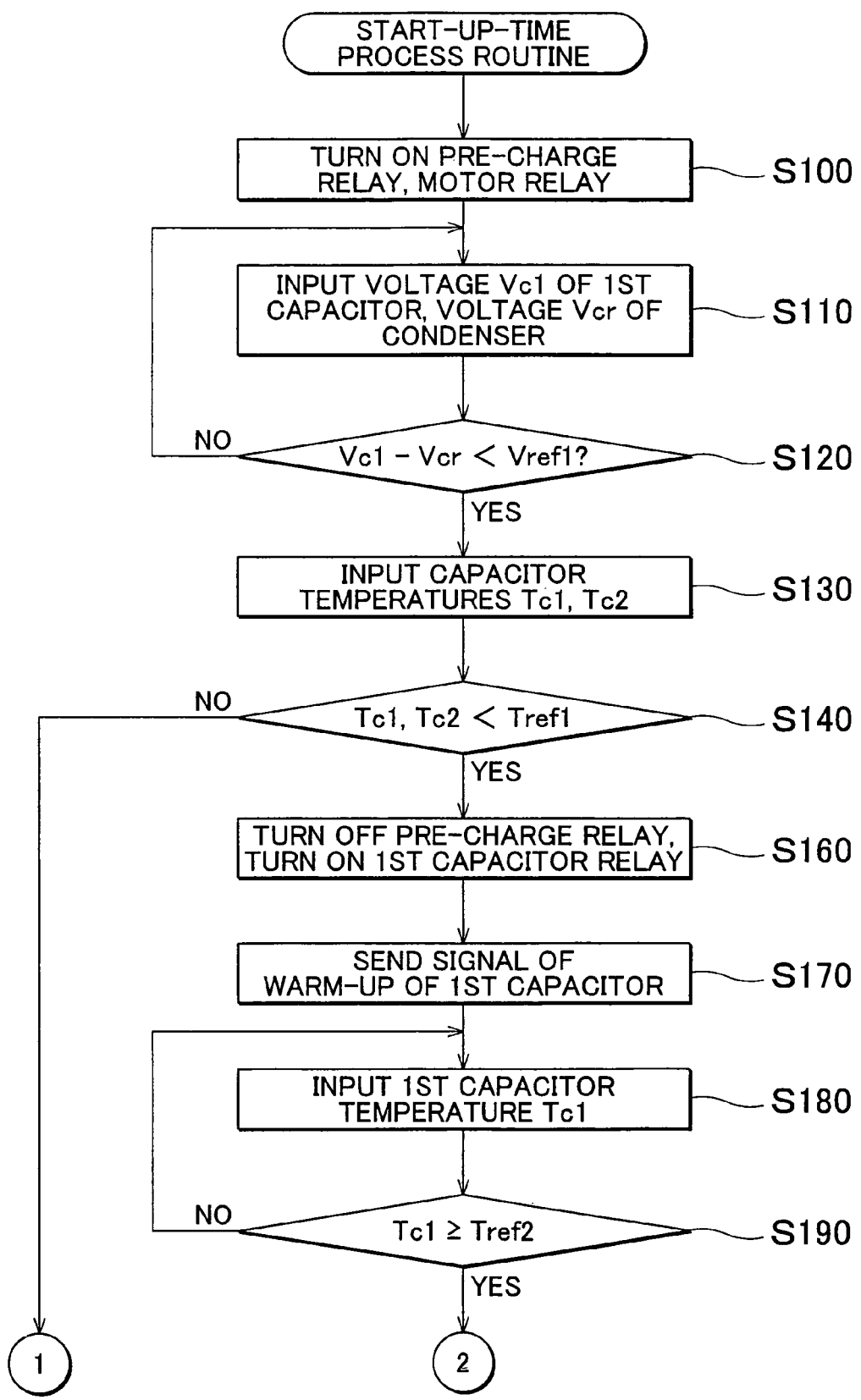

DRIVE DEVICE, HYBRID VEHICLE EQUIPPED WITH THE DRIVE DEVICE, AND CONTROL METHOD FOR DRIVE DEVICE

INCORPORATED BY REFERENCE

The disclosure of Japanese Patent Application No. JP-2008-106975 filed on Apr. 16, 2008 including the specification, drawings and abstract is incorporated herein by reference in its entirety.

BACKGROUND OF THE INVENTION

1. Field of the Invention

The invention relates to a drive device, a hybrid vehicle equipped with the drive device, and a control method for the drive device.

2. Description of the Related Art

A drive device that raises the operating voltage of a capacitor if the device detects a low temperature that increases the internal resistance of the capacitor has been proposed (e.g., see Japanese Patent Application Publication No. 2002-142373 (JP-A-2002-142373)). In this device, raising the operating voltage of the capacitor when the temperature is low compensate for the reduction of the amount of electricity stored in the capacitor caused by the increase of the internal resistance when the temperature is low.

Besides, a device that warms a battery by actively charging or discharging the battery when the temperature of the battery is low has also been proposed (e.g., see Japanese Patent Application Publication No. 2000-40536 (JP-A-2000-40536)). In this device, the warm up of the battery is performed by the internal heat generation that occurs when the battery is charged or discharged.

In a drive device that uses a plurality of capacitors connected in parallel with a motor, it is desired to quickly warm up the capacitors during the system start-up since the capacitor internal resistance is large due to low temperature. For such an occasion, it is conceivable to actively charge and discharge the capacitors. However, this often ends up with the unnecessary driving of the motor, or requires a special circuit for actively charging and discharging the capacitors.

SUMMARY OF THE INVENTION

The invention proposes a drive device, a hybrid vehicle equipped with the drive device, and a control method for the drive device which are capable of quickly warming up a plurality of capacitors during the system start-up.

A first aspect of the invention relates to a drive device that includes at least one electric motor that inputs and outputs motive power. The drive device includes: a plurality of capacitors connected parallel to the electric motor and being capable of sending and receiving electric power to and from the electric motor; a plurality of relays for capacitors that electrically connects and disconnects the plurality of capacitors to the electric motor; and a relay control device that controls the plurality of relays for capacitors. The relay control device controls the plurality of relays for capacitors to drive the electric motor in a partially-on-state in which a part of the plurality of relays for capacitors is connected during a system start-up. The relay control device controls the plurality of relays for capacitors to drive the electric motor in a remainder-on-state in which a remaining part of the plurality of relays for capacitors are connected after a first predetermined condition is satisfied while the electric motor is being driven in the partially-on-state. The relay control device controls the plurality of relays for capacitors to drive the electric motor in a state in which all the plurality of relays are connected after a second predetermined condition is satisfied while the at least one electric motor is being driven in the remainder-on-state.

According to the foregoing aspect of the invention, the plurality of relays for capacitors is controlled to drive the electric motor in a partially-on-state in which the part of the plurality of relays for capacitors are connected during a system start-up. Since the amount of heat generated by a capacitor is calculated as a multiplication product of the current squared and the internal resistance, the current that flows through a capacitor corresponding to the relay that is being connected can be made larger by driving the electric motor while the part of the plurality of relays for capacitors are connected than by driving the electric motor while all the relays for capacitors are connected. Thus, the warm up of the part of capacitors corresponding to the part of relays for capacitors can be quickly accomplished.

Then, the plurality of relays for capacitors is controlled so that after the first predetermined condition is satisfied while the electric motor is being driven in the partially-on-state, the electric motor is driven in the remainder-on-state in which the part of relays for capacitors are disconnected and the remaining part of capacitors corresponding to the remaining part of relays for capacitors is connected. Hence, the remaining part of capacitors corresponding to the remaining part of relays for capacitors can be quickly warmed up.

Furthermore, the plurality of relays for capacitors are controlled so that after the second predetermined condition is satisfied while the electric motor is being driven in the remainder-on-state, the electric motor is driven in the state in which all the plurality of relays for capacitors are connected. Hence, the warm up of all the capacitors can be completed, and all the capacitors can be used to drive the electric motors.

The amount of heat generated by a capacitor calculated as a multiplication product of the current squared and the internal resistance. Therefore, for example, if two capacitors are alternately warmed up, the two capacitors can be warmed up comparatively quickly for the following reason. That is, in the case where an electric motor is driven while one of the two capacitors is connected, the current that flows through the one capacitor of the two capacitors is twice as great and the amount of heat generated by the one capacitor is four times as great as in the case where the electric motor is driven while the two capacitors are connected. Therefore, in the case where only one of the two capacitors is connected, the one capacitor can be warmed up in a fourth time as in the case where both the capacitors are connected and together warmed up. Hence, the amount of time needed for the warm up of the two capacitors in the case where the two capacitors are alternately warmed up is half the amount of time needed for the warm up of the two capacitors in the case where the two capacitors are connected and simultaneously warmed up. Hence, by alternately performing the warm up of the part of capacitors of a plurality of capacitors and the warm up of the remaining part of capacitors, the amount of time needed for the warm up of all the capacitors can be reduced. That is, the plurality of capacitors can be quickly warmed up.

A second aspect of the invention relates to a hybrid vehicle. The hybrid vehicle includes an internal combustion engine that outputs motive power for driving the hybrid vehicle, and the drive device according to the foregoing first aspect. Besides, the electric motor of the drive device is mounted so as to be capable of outputting the motive power for driving.

Namely, the hybrid vehicle has a drive device that includes at least one electric motor that inputs and outputs motive power, and that further includes: a plurality of capacitors connected parallel to the electric motor and being capable of sending and receiving electric power to and from the electric motor; a plurality of relays for capacitors that electrically connects and disconnects the plurality of capacitors to the electric motor; and a relay control device that controls the plurality of relays for capacitors. The relay control device controls the plurality of relays for capacitors to drive the electric motor in a partially-on-state in which a part of the plurality of relays for capacitors are connected during a system start-up, controls the plurality of relays for capacitors to drive the electric motor in a remainder-on-state in which a remaining part of the plurality of relays for capacitors are connected after a first predetermined condition is satisfied while the electric motor is being driven in the partially-on-state, and controls the plurality of relays for capacitors to drive the electric motor in a state in which all the plurality of relays are connected after a second predetermined condition is satisfied while the at least one electric motor is being driven in the remainder-on-state.

According to the foregoing aspect, since the drive device according to the first aspect is mounted in the hybrid vehicle, the hybrid vehicle is able to achieve substantially the same advantages as those achieved by the drive device of the first aspect, for example, the advantage of being able to quickly warm up the part of capacitors corresponding to the part of relays for capacitors during the system start-up, and the advantage of being able to quickly warm up the remaining capacitors corresponding to the remaining part of relays for capacitors.

A third aspect of the invention relates to a control method for a drive device that includes at least one electric motor that inputs and outputs motive power, a plurality of capacitors connected parallel to the electric motor and being capable of sending and receiving electric power to and from the at least one electric motor, and a plurality of relays for capacitors that electrically connects and disconnects the plurality of capacitors to the electric motors. The control method includes controlling the plurality of relays for capacitors to drive the electric motor in a partially-on-state in which a part of the plurality of relays for capacitors are connected during a system start-up; controlling the plurality of relays for capacitors to drive the electric motor in a remainder-on-state in which a remaining part of the plurality of relays for capacitors are connected after a first predetermined condition is satisfied while the electric motor is being driven in the partially-on-state, and controlling the plurality of relays for capacitors to drive the electric motor in a state in which all the plurality of relays are connected after a second predetermined condition is satisfied while the at least one electric motor is being driven in the remainder-on-state.

According to the foregoing aspect, the plurality of relays for capacitors is controlled to drive electric motor in the partially-on-state in which the part of relays for capacitors is connected during a system start-up. Since the amount of heat generated by a capacitor is calculated as a multiplication product of the current squared and the internal resistance, the current that flows through the capacitor corresponding to the relay that is connected can be made larger by driving the electric motor while the part of the plurality of relays for capacitors are connected than by driving the electric motor while all the relays for capacitors are connected. Thus, the warm up of the part of capacitors corresponding to the part of relays for capacitors can be quickly accomplished.

Then, the plurality of relays for capacitors are controlled to drive the electric motor in a remainder-on-state in which a remaining part of the plurality of relays for capacitors are connected after a first predetermined condition is satisfied while the electric motor is being driven in the partially-on-state. Therefore, the remaining part of capacitors corresponding to the remaining part of relays for capacitors can be quickly warmed up.

Furthermore, the plurality of relays for capacitors are controlled to drive the electric motor in a state in which all the plurality of relays are connected after a second predetermined condition is satisfied while the at least one electric motor is being driven in the remainder-on-state. Therefore, the warm up of all the capacitors can be completed, and all the capacitors can be used to drive the electric motors. The amount of heat generated by a capacitor calculated as a multiplication product of the current squared and the internal resistance. Therefore, for example, if two capacitors are alternately warmed up, the two capacitors can be warmed up comparatively quickly for the following reason. That is, in the case where an electric motor is driven while one of the two capacitors is connected, the current that flows through the one capacitor of the two capacitors is twice as great and the amount of heat generated by the one capacitor is four times as great as in the case where the electric motor is driven while the two capacitors are connected. Therefore, in the case where only one of the two capacitors is connected, the one capacitor can be warmed up in a fourth time as in the case where both the capacitors are connected and together warmed up. Hence, the amount of time needed for the warm up of the two capacitors in the case where the two capacitors are alternately warmed up is half the amount of time needed for the warm up of the two capacitors in the case where the two capacitors are connected and simultaneously warmed up. Hence, by alternately performing the warm up of the part of capacitors and the warm up of the remaining part of capacitors, the amount of time needed for the warm up of all the capacitors can be reduced. That is, the plurality of capacitors can be quickly warmed up.

A fourth aspect of the invention relates to a drive device that includes at least one electric motor that inputs and outputs motive power. The drive device includes: a plurality of capacitors connected parallel to the electric motor and being capable of sending and receiving electric power to and from the electric motor; a plurality of relays for capacitors that electrically connects and disconnects the plurality of capacitors to the electric motor; and a relay control device that controls the plurality of relays for capacitors to drive the electric motor in a partially-on-state in which a part of the plurality of relays for capacitors are connected during a system start-up.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 3A and 3B are each a flowchart showing an example of a start-up-time process routine that is executed by a motor ECU.

DETAILED DESCRIPTION OF EMBODIMENT

Embodiments of the invention will be described with reference to FIGS. 1 to 3A, and 3B.

Figure 1:
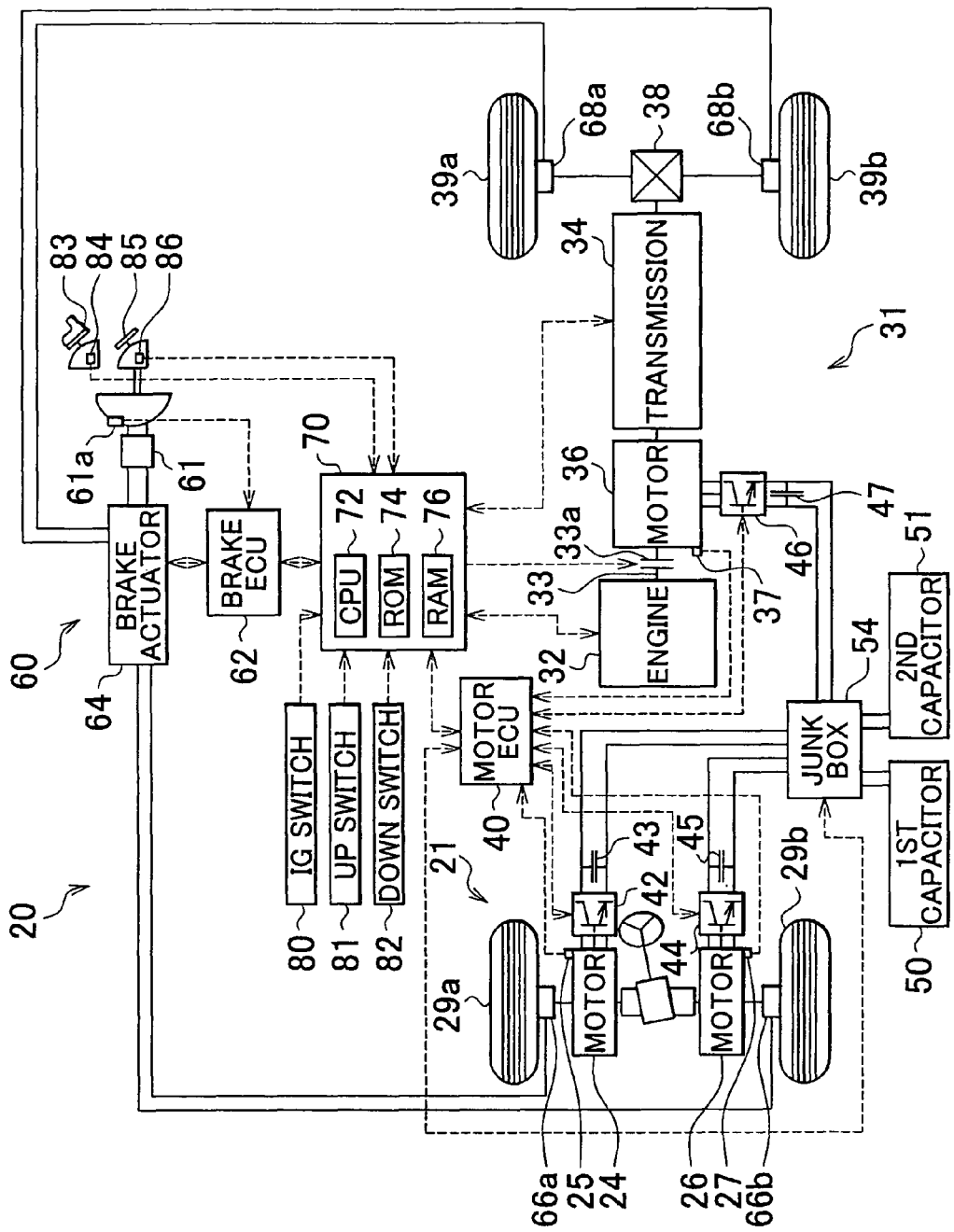
FIG. 1 is a construction diagram showing a general construction of a hybrid motor vehicle developed for racing which is equipped with a drive device as an embodiment of the invention.

FIG. 1 is a construction diagram showing a general construction of a hybrid motor vehicle 20 developed for racing which is equipped with a drive device as an embodiment of the invention. The hybrid motor vehicle 20 of the embodiment, as shown in FIG. 1, includes: a front wheel drive system 21 that has two front wheel-dedicated electric motors 24, 26 attached to left and right front wheels 29a, 29b; a rear wheel drive system 31 that outputs motive power transmitted from an engine 32 and from an electric motor 36 attached to a crankshaft 33 of the engine 32 via a clutch 33a, to left and right rear wheels 39a, 39b via a transmission 34 and a differential gear 38; two capacitors (a first capacitor, and a second capacitor) 50, 51 that send electric power to and receive electric power from the front wheel-dedicated motors 24, 26 and the motor 36; an electronically controlled hydraulic brake unit (hereinafter, referred to as the "ECB") 60 that provides braking torque by applying oil pressure to wheel cylinders 66a, 66b, 68a, 68b of the left and right front wheels 29a, 29b and the left and right rear wheels 39a, 39b; and a main electronic control unit 70 that controls the hybrid motor vehicle 20 as a whole.

The front wheel-dedicated motors 24, 26 are similar motors contracted as synchronous generator-motors, and send electric power to and receive electric power from the first capacitor 50 and the second capacitor 51 via inverters 42, 44, and a junk box 54. That is, the front wheel-dedicated motors 24, 26 function as motive power units capable of outputting and distributing braking force and drive force to the left and right front wheels 29a, 29b independently of each other. The front wheel-dedicated motors 24, 26 are driven and controlled by a motor-dedicated electronic control unit (hereinafter, referred to as the "motor ECU") 40.

The motor 36 is constructed as a well-known synchronous generator-motor capable of working as a generator and also working as an electric motor, and sends electric power to and receives electric power from the first capacitor 50 and the second capacitor 51 via an inverter 46 and the junk box 54. The motor 36, similarly to the front wheel-dedicated motors 24, 26, is driven and controlled by the motor ECU 40.

The motor ECU 40 inputs signals needed for driving and controlling the front wheel-dedicated motors 24, 26 and the motor 36, for example, signals from rotational position detection sensors 25, 27, 37 that detect the rotational positions of rotors of the front wheel-dedicated motors 24, 26 and the motor 36, phase currents applied to the front wheel-dedicated motors 24, 26 and the motor 36 which are detected by current sensors (not shown), etc. The motor ECU 40 outputs switching control signals to the inverters 42, 44, 46. The inverters 42, 44, 46 are each constructed as a well-known inverter circuit that is made up of six switching elements, and six diodes.

The first capacitor 50 and the second capacitor 51 are constructed as, for example, electric double layer capacitors, and are connected to the inverters 42, 44, 46 via the junk box 54.

Figure 2:
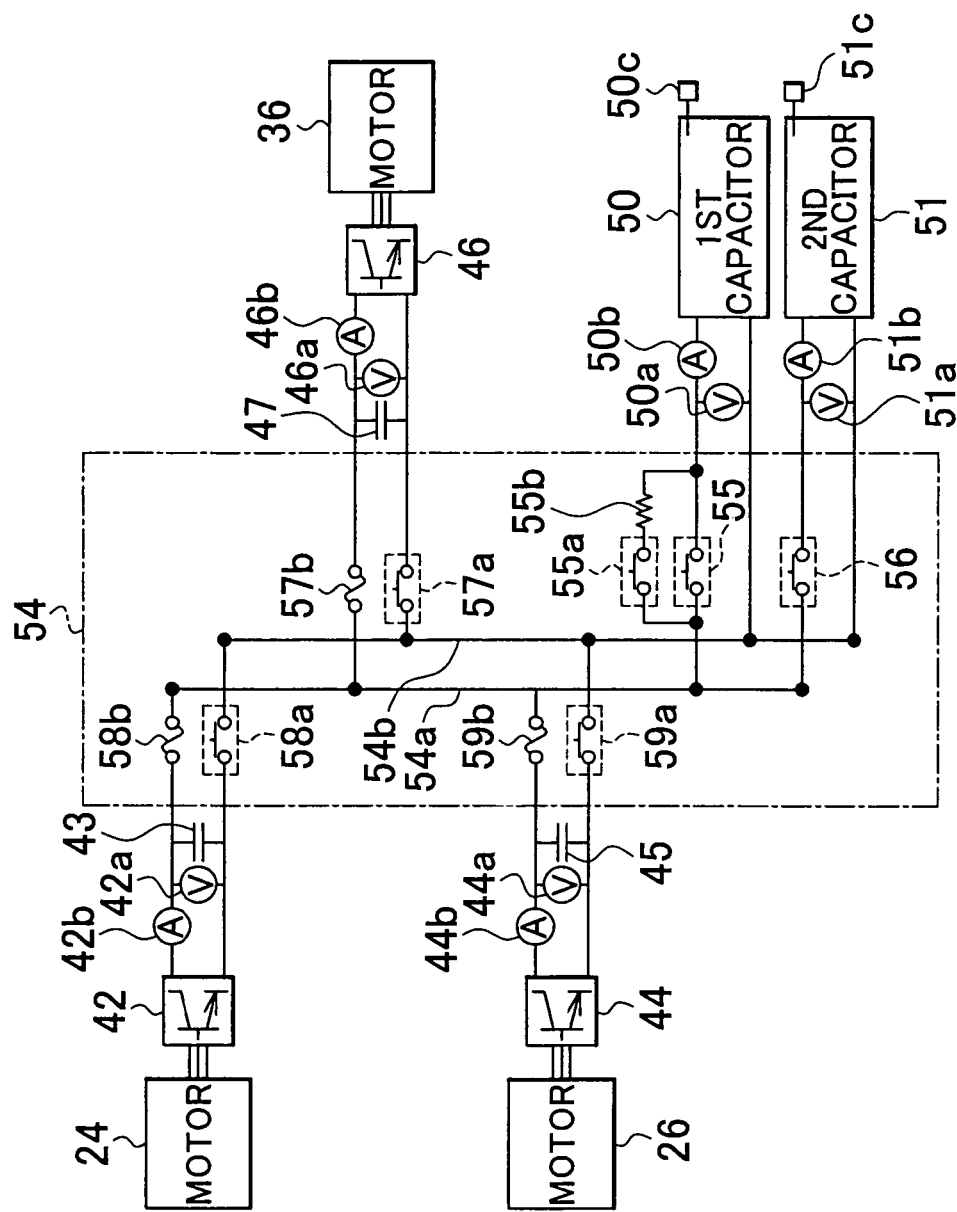
FIG. 2 is a construction diagram showing an example of a construction of an electric system of the hybrid motor vehicle of the embodiment.

FIG. 2 is a construction diagram showing an example of a construction of an electric system of the hybrid motor vehicle 20 of the embodiment. As shown in FIG. 2, in the junk box 54, there are disposed: a positive electrode bus bar 54a formed of an electroconductive material (e.g., copper) which is connected to positive electrode-side terminals of the first capacitor 50 and the second capacitor 51 and which is connected to positive electrode-side terminals of the inverters 42, 44, 46 of the front wheel-dedicated motors 24, 26 and the motor 36; a negative electrode bus bar 54b formed of an electroconductive material (e.g., copper) which is connected to negative electrode-side terminals of the first capacitor 50 and the second capacitor 51 and which is connected to negative electrode-side terminals of the inverters 42, 44, 46 of the front wheel-dedicated motors 24, 26 and the motor 36; relays 55, 56 interposed between the positive electrode bus bar 54a and the positive electrode-side terminals of the first capacitor 50 and the second capacitor 51; a relay 55a and a resistor 55b (shown by a zigzag line in FIG. 2) that are connected in parallel with the relay 55 so as to avoid inrush current when the relay 55 is turned on; relays 57a, 58a, 59a interposed between the negative electrode bus bar 54b and the negative electrode-side terminals of the inverters 42, 44, 46 of the front wheel-dedicated motors 24, 26 and the motor 36; and fuses 57b, 58b, 59b interposed between the positive electrode bus bar 54a and the positive electrode-side terminals of the inverters 42, 44, 46 of the front wheel-dedicated motors 24, 26 and the motor 36.

The relays 55, 55a, 56 for a power source are attached at the positive electrode side, and the relays 57a, 58a, 59a for the motors are attached at the negative electrode side. By turning off all the relays, the first capacitor 50 and the second capacitor 51 can be completely cut off from the front wheel-dedicated motors 24, 26 and the motor 36. Besides, the first capacitor 50 and the second capacitor 51 are provided with voltage sensors 50a, 51a that detect the inter-terminal voltage, current sensors 50b, 51b that detect charge current, and temperature sensors 50c, 51c that detect the temperatures Tc1, Tc2 of the first capacitor 50 and the second capacitor 51.

Smoothing capacitors 43, 45, 47 are attached between the terminals of the inverters 42, 44, 46 of the front wheel-dedicated motors 24, 26 and of the motor 36. Voltage sensors 42a, 44a, 46a that detect the inter-terminal voltages and current sensors 42b, 44b, 46b that detect currents applied to the inverters 42, 44, 46 are attached at a side of the smoothing condensers 43, 45, 47 that is toward the inverters 42, 44, 46.

Voltages Vc1, Vc2, Vcfr, Vcfl, Vcr detected by the voltage sensors 50a, 51a, 42a, 44a, 46a, currents Ic1, Ic2, Ifr, Ifl, Ir detected by the current sensors 50b, 51b, 42b, 44b, 46b, and temperatures Tc1, Tc2 detected by the temperature sensors 50c, 51c are input to the motor ECU 40 (see FIG. 1).

The relays 55, 55a, 56, 57a, 58a, 59a are turned on and off by drive signals from the motor ECU 40.

Incidentally, the motor ECU 40 communicates with the main electronic control unit 70, and drives and controls the front wheel-dedicated motors 24, 26 and the motor 36 by control signals from the main electronic control unit 70, and outputs to the main electronic control unit 70 data regarding the operation states of the front wheel-dedicated motors 24, 26 and the motor 36 if required, the inter-terminal voltages Vc1, Vc2 of the first capacitor 50 and the second capacitor 51, the charging currents Ic1, Ic2 thereof, the temperatures Tc1, Tc2 thereof, the inter-terminal voltages Vcfr, Vcfl, Vcr of the smoothing condensers 43, 45, 47, and the applied currents Ifr, Ifl, Ir to the inverters 42, 44, 46. Besides, the motor ECU 40 computes rotation speeds Nfl, Nfr, Nm of the front wheel-dedicated motors 24, 26 and the motor 36 on the basis of the signals from the rotational position detection sensors 25, 27, 37.

Here, FIG. 1 will be further described. The engine 32 is an internal combustion engine that outputs motive power using a hydrocarbon-based fuel, such as gasoline, light oil, etc., and is subjected to controls of the amount of fuel injection, the ignition timing, the intake air amount, etc., which are performed by the main electronic control unit 70 that inputs signals from various sensors that detect the operation state of the engine 32.

The transmission 34 is constructed as, for example, a hydraulically driven 6-speed transmission, and the speed shifting of the transmission 34 is controlled so that the upshifts and downshifts of the transmission ratio are performed by the main electronic control unit 70 that inputs signals based on the operation of an upshift switch 81 and a downshift switch 82 performed by a driver.

The ECB 60 includes a master cylinder 61 that is pressurized by depression of a brake pedal 85, a brake actuator 64 that adjusts the oil pressures to the wheel cylinders 66a, 66b, 68a, 68b so that, the braking torques, that needs to act on the vehicle according to the pressure (brake depression force) of the master cylinder 61, act on the left and right front wheels 29a, 29b and the left and right rear wheels 39a, 39b according to the sharing proportion of the ECB 60, and a brake electronic control unit 60 (hereinafter, referred to as the "brake ECU 60") that drives and controls the brake actuator 64.

The brake ECU 62 inputs the master cylinder pressure (brake depression force Fb) detected by a master cylinder pressure sensor 61a that is attached to the master cylinder 61, the road wheel speeds from wheel speed sensors (not shown) that are provided on the left and right front wheels 29a, 29b and the left and right rear wheels 39a, 39b, etc. The brake ECU 62 outputs a drive signal to the brake actuator 64. The brake ECU 62 communicates with the main electronic control unit 70, and causes braking torque to act on the left and right front wheels 29a, 29b and the left and right rear wheels 39a, 39b by a control signal from the main electronic control unit 70, and also outputs to the main electronic control unit 70 data regarding the state of the ECB 60 if required.

The main electronic control unit 70 is constructed as a microprocessor that has a CPU 72 as a central component. Besides the CPU 72, the unit 70 further includes a ROM 74 that stores process programs, a RAM 76 that temporarily stores data, input and output ports (not shown), and a communication port (not shown). The main electronic control unit 70 inputs, via input ports, an ignition signal from an ignition switch 80, signals from the upshift switch 81 and the downshift switch 82 that command an upshift and a downshift, respectively, of the transmission 34, an accelerator operation amount Acc from an accelerator pedal position sensor 84 that detects the amount of depression of an accelerator pedal 83, a brake pedal position BP from a brake pedal position sensor 86 that detects the amount of depression of the brake pedal 85, etc. As described above, the main electronic control unit 70 is connected with the motor ECU 40 and the brake ECU 62 via communication ports, and sends and receives various control signals and data to and from the motor ECU 40 and the brake ECU 62.

The hybrid motor vehicle 20 of this embodiment constructed as described above adjusts the intake air amount of the engine 32 and causes the front wheel-dedicated motors 24, 26 and the motor 36 to output torque by using electric power stored in the first capacitor 50 and the second capacitor 51, according to the amount of depression of the accelerator pedal 83. And the hybrid motor vehicle 20 of this embodiment outputs the brake torque commensurate with the depressing force (depression force) on the brake pedal 85 from the ECB 60 as well as from the front wheel-dedicated motors 24, 26 and the motor 36, and stores the regenerative electric power obtained for the output of regenerative torque of the front wheel-dedicated motors 24, 26 and the motor 36, into the first capacitor 50 and the second capacitor 51.

Next, the operation performed to start the system of the hybrid motor vehicle 20 of the embodiment will be described. When the ignition switch 80 is turned on, the CPU 72 of the main electronic control unit 70 starts up the engine 32, and sends to the motor ECU 40 a control signal that causes the motor ECU 40 to execute a start-up-time process.

Figure 3B:
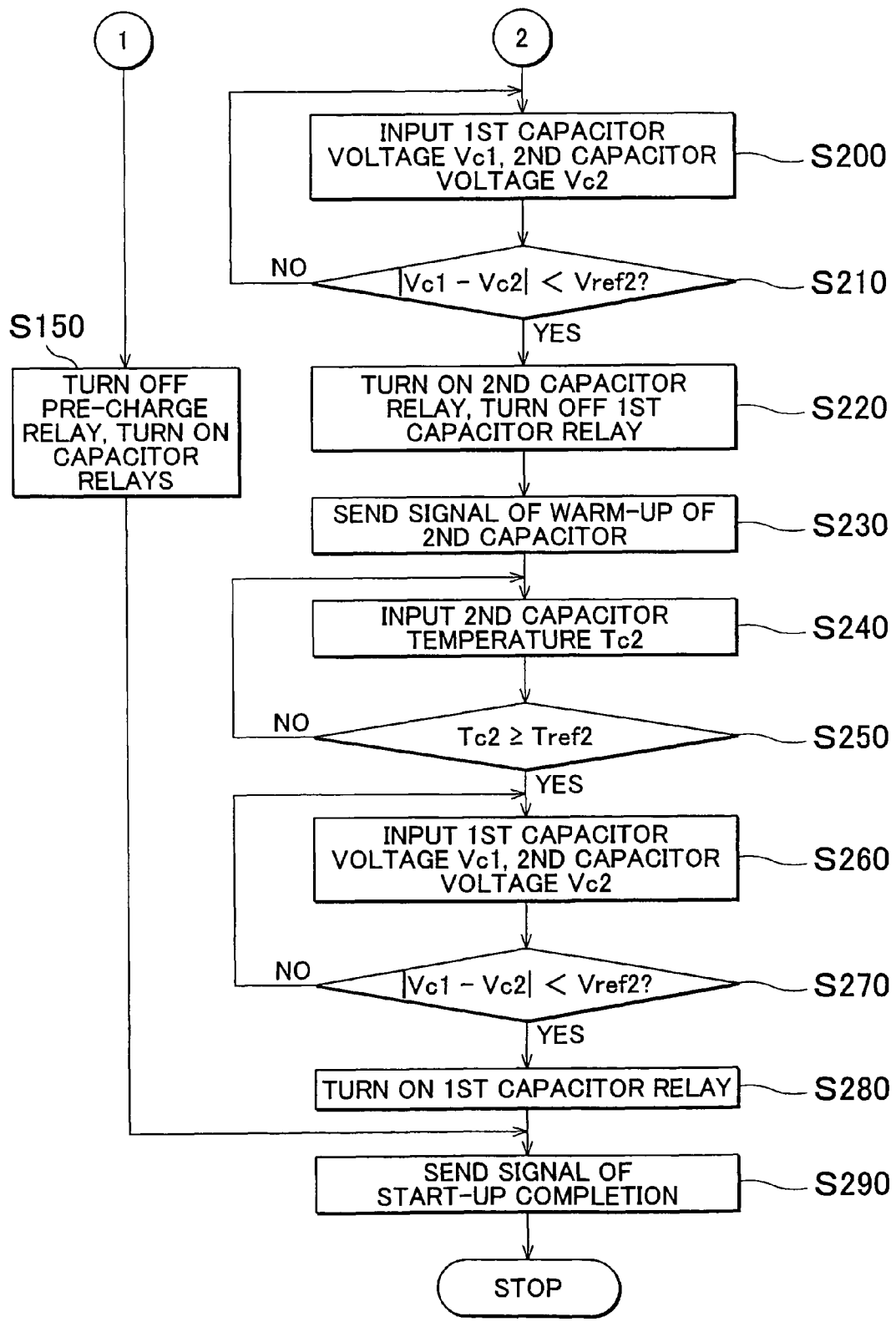

FIGS. 3A and 3B are a flowchart showing an example of a start-up-time process routine that is executed by the motor ECU 40. When this routine is executed, the motor ECU 40 turns on the relays 57a, 58a, 59a that correspond to the front wheel-dedicated motors 24, 26 and the motor 36, and also turns on the precharge relay 55a (step S100). Next, the motor ECU 40 inputs the inter-terminal voltage Vc1 of the first capacitor 50 detected by the voltage sensor 50a, and the voltage Vcr of the smoothing capacitor 47 detected by the voltage sensor 46a (step S110), and then determines whether a difference between the thus-input inter-terminal voltage Vc1 of the first capacitor 50 and the thus-input voltage Vcr of the smoothing capacitor 47 has become less than a threshold value Vref1 (step S120). The motor ECU 40 repeats the process of inputting the detected inter-terminal voltage Vc1 of the first capacitor 50 and the detected voltage Vcr of the smoothing capacitor 47, and the process of comparing the difference between the two voltages with the threshold value Vref1, until the difference between the inter-terminal voltage Vc1 of the first capacitor 50 and the voltage Vcr of the smoothing capacitor 47 becomes less than the threshold value Vref1. Herein, the threshold value Vref1 is a threshold value for determining whether the charging of the smoothing capacitor 47 has been completed, and may be a relatively small value.

When the difference between the inter-terminal voltage Vc1 of the first capacitor 50 and the voltage Vcr of the smoothing capacitor 47 becomes less than the threshold value Vref1, the motor ECU 40 decides that the charging of the smoothing capacitor 43, 45, 47 has been completed. Then, the motor ECU 40 inputs the temperatures Tc1, Tc2 of the first capacitor 50 and the second capacitor 51 from the temperature sensors 50c, 51c (step S130), and determines whether both the temperatures Tc1, Tc2 of the first capacitor 50 and the second capacitor 51 are greater than or equal to a threshold value Tref1 (step S140). It is to be noted herein that the threshold value Tref1 is a threshold value for determining whether it is necessary to warm up the first capacitor 50 and the second capacitor 51, and may be set at, for example, 60° C., 70° C., etc.

When both the temperatures Tc1, Tc2 of the first capacitor 50 and the second capacitor 51 are greater than or equal to the threshold value Tref1, the motor ECU 40 decides that the warm up is not necessary, and turns off the precharge relay 55a, and turns on the relays 55, 56 for the first capacitor 50 and the second capacitor 51 (step S150), and sends a control signal of completion of the start-up process to the main electronic control unit 70 (step S290), and then ends this routine.

On the other hand, when either one of the temperatures Tc1, Tc2 of the first capacitor 50 and the second capacitor 51 is less than the threshold value Tref1, the motor ECU 40 decides that the warm up is necessary, and turns off the precharge relay 55a, and turns on the relay 55 corresponding to the first capacitor 50 (step S160). Then, the motor ECU 40 sends to the main electronic control unit 70 a control signal that shows that the first capacitor 50 is being warmed up (step S170), and waits for the temperature Tc1 of the first capacitor 50 from the temperature sensor 50c to become greater than or equal to the threshold value Tref2 (steps S180 and S190).

Upon receiving the control signal showing that the first capacitor 50 is being warmed up, the main electronic control unit 70 checks that the starting of the engine 32 has been completed, and completes the system start-up, and then starts a travel by the motive power from the engine 32, and the driving of the front wheel-dedicated motors 24, 26 and the motor 36 within the range of input/output restrictions of the first capacitor 50. It is to be noted herein that the threshold value Tref2 is a threshold value for determining whether the warm up of the first capacitor 50 has been completed, and may be set at, for example, 65° C., 75° C., etc.

When the temperature Tc1 of the first capacitor 50 becomes equal to or greater than the threshold value Tref2, the motor ECU 40 inputs the inter-terminal voltages Vc1, Vc2 of the first capacitor 50 and the second capacitor 51 detected by the voltage sensors 50a, 51a (step S200), and determines whether a voltage difference between the thus-input inter-terminal voltages Vc1, Vc2 of the first capacitor 50 and the second capacitor 51 is less than a threshold value Vref2 (step S210). Then, when the voltage difference between the inter-terminal voltages Vc1, Vc2 of the first capacitor 50 and the second capacitor 51 is greater than or equal to the threshold value Vref2, the motor ECU 40 repeats the process of inputting the inter-terminal voltages Vc1, Vc2 and the process of comparing the voltage difference with the threshold value Vref2. It is to be noted herein that the threshold value Vref2 is set as a voltage difference such that even if the first capacitor 50 and the second capacitor 51 are interconnected, excessive current will not flow between the capacitors or through the inverters 42, 44, 46, and may be determined in accordance with the performances of the first capacitor 50 and the second capacitor 51, and the performances of the inverters 42, 44, 46.

When the voltage difference between the inter-terminal voltages Vc1, Vc2 of the first capacitor 50 and the second capacitor 51 becomes less than the threshold value Vref2, the motor ECU 40 turns off the relay 55 corresponding to the first capacitor 50, and turns on the relay 56 corresponding to the second capacitor 51 (step S220). Then, the motor ECU 40 sends to the main electronic control unit 70 a control signal showing that the second capacitor 50 is being warmed up (step S230), and waits for the temperature Tc2 of the second capacitor 51 detected by the temperature sensor 51c to become equal to or greater than the threshold value Tref2 (steps S240 and S250). Upon receiving the control signal showing that the second capacitor 51 is being warmed up, the main electronic control unit 70 causes the vehicle to travel by the motive power from the engine 32, and by the drive of the front wheel-dedicated motors 24, 26 and the motor 36 within the range of the input/output restrictions of the second capacitor 51.

When the temperature Tc2 of the second capacitor 51 becomes equal to or greater than the threshold value Tref2, the motor ECU 40 inputs the inter-terminal voltages Vc1, Vc2 of the first capacitor 50 and the second capacitor 51 from the voltage sensors 50a, 51a (step S260), and determines whether the voltage difference between the thus-input inter-terminal voltages Vc1, Vc2 of the first capacitor 50 and the second capacitor 51 is less than the threshold value Vref2 (step S270). Then, when the voltage difference between the inter-terminal voltages Vc1, Vc2 of the first capacitor 50 and the second capacitor 51 is greater than or equal to the threshold value Vref2, the motor ECU 40 repeats the process of inputting the inter-terminal voltages Vc1, Vc2, and the process of comparing the voltage difference therebetween with the threshold value Vref2.

Then, when the voltage difference between the inter-terminal voltages Vc1, Vc2 of the first capacitor 50 and the second capacitor 51 becomes less than the threshold value Vref2, the motor ECU 40 turns on the relay 55 corresponding to the first capacitor 50 (step S280), and sends the control signal of completion of the start-up process to the main electronic control unit 70 (step S290), and then ends the routine.

The warm up of the first capacitor 50 and the warm up of the second capacitor 51 are alternately performed in the foregoing manner because the amount of heat generated by a capacitor is calculated as a multiplication product of the current squared and the internal resistance. The current that flows through one of the first capacitor 50 and the second capacitor 51 when the front wheel-dedicated motors 24, 26 and the motor 36 are driven while the one of the capacitors alone is connected is twice the current that flows through one of the capacitors while the two capacitors 50, 51 are connected. Hence, if the front wheel-dedicated motors 24, 26 and the motor 36 are driven in the case where only one of the first capacitor 50 and the second capacitor 51 is connected, the amount of heat generated by the capacitor is four times as great, so that the connected one of the capacitors can be warmed up in a fourth time that is needed in order to warm up the capacitor in the case where the two capacitors 50, 51 are connected. Therefore, the amount of time needed for the warm up of the two capacitors in the case where the first capacitor 50 and the second capacitor 51 are alternately warmed up is half the amount of time needed for the warm up of the two capacitors in the case where the two capacitors 50, 51 are connected and simultaneously warmed up. Thus, the warm up of the first capacitor 50 and the second capacitor 51 can be quickly accomplished.

According to the hybrid motor vehicle 20 of the foregoing embodiment, when the first capacitor 50 and the second capacitor 51 need warm up, the motor ECU 40 is able to accomplish the warm up of the first capacitor 50 and the second capacitor 51 quickly by alternately performing the warm up of the first capacitor 50 and the warm up of the second capacitor 51.

In the hybrid motor vehicle 20 of the embodiment, when the warm up of the first capacitor 50 and the second capacitor 51 is needed during the system start-up, the motor ECU 40 warms up the first capacitor 50 and then warms up the second capacitor 51. Instead, the second capacitor 51 may be warmed up before the first capacitor 50 is warmed up.

In the hybrid motor vehicle 20 of the embodiment, the two capacitors, that is, the first capacitor 50 and the second capacitor 51, are connected in parallel, and the motor ECU 40 warms up the first capacitor 50 before warming up the second capacitor 51 when the warm up of the first capacitor 50 and the second capacitor 51 is needed during the system start-up. However, it is also permissible to connect three or more capacitors in parallel, and warm up one or more out of the three or more capacitors before warming up the one or more remainder capacitors when the warm up of those three or more capacitors is needed during the system start-up.

In the hybrid motor vehicle 20 of this embodiment, the motor ECU 40 determines the completion of the warm up of the first capacitor 50 based on whether the temperature Tc1 of the first capacitor 50 has reached or exceeded the threshold value Tref2, and determines the completion of the warm up of the second capacitor 51 based on whether the temperature Tc2 of the second capacitor 51 has reached or exceeded the threshold value Tref2. However, the threshold value used for the determination regarding the completion of the warm up of the first capacitor 50 and the threshold value used for the determination regarding the completion of the warm up of the second capacitor 51 may be different from each other.

In the hybrid motor vehicle 20 of the embodiment, the motor ECU 40 determines the completion of the warm up of the first capacitor 50 based on whether temperature Tc1 of the first capacitor 50 has reached or exceeded the threshold value Tref2. However, the completion of the warm up of the first capacitor 50 may also be determined based on whether a predetermined time has elapsed following the start of the warm up of the first capacitor 50. Besides, the completion of the warm up of the second capacitor 51 may also be determined based on whether a predetermined time has elapsed following the start of the warm up of the second capacitor 51. In this case, the predetermined time for the completion of the warm up of the first capacitor 50 and the predetermined time for the completion of the warm up of the second capacitor 51 may be equal or may be different.

In the hybrid motor vehicle 20 of the embodiment, the three motors, that is, the front wheel-dedicated motors 24, 26 and the motor 36, are connected parallel to the first capacitor 50 and the second capacitor 51. However, it is also permissible to connect one motor to the first capacitor 50 and to the second capacitor 51, or to connect two motors parallel to the first capacitor 50 and the second capacitor 51, or to connect four or more motors parallel to the first capacitor 50 and the second capacitor 51.

In the hybrid motor vehicle 20 of the embodiment, the relays 55, 56 are attached intervening between the positive electrode bus bar 54a and the positive electrode-side terminals of the first capacitor 50 and the second capacitor 51, and relays 57a, 58a, 59a are attached intervening between the negative electrode bus bar 54b and the negative electrode-side terminals of the inverters 42, 44, 46 of the front wheel-dedicated motors 24, 26 and the motor 36. However, it is also permissible that the relays 55, 56 may be attached so as to intervene between the negative electrode bus bar 54b and the negative electrode-side terminals of the first capacitor 50 and the second capacitor 51, and that the relays 57a, 58a, 59a may be attached so as to intervene between the positive electrode bus bar 54a and the positive electrode-side terminals of the inverters 42, 44, 46 of the front wheel-dedicated motors 24, 26 and the motor 36.

It is also permissible that the relays 55, 56 may be attached so as to intervene between the positive electrode bus bar 54a and the positive electrode-side terminals of the first capacitor 50 and the second capacitor 51 and also intervene between the negative electrode bus bar 54b and the negative electrode-side terminals of the first capacitor 50 and the second capacitor 51, and that the relays 57a, 58a, 59a may be attached so as to intervene between the positive electrode bus bar 54a and the positive electrode-side terminals of the inverters 42, 44, 46 of the front wheel-dedicated motors 24, 26 and the motor 36 and also intervene between the negative electrode bus bar 54b and the negative electrode-side terminals of the inverters 42, 44, 46 of the front wheel-dedicated motors 24, 26 and the motor 36.

Furthermore, it is also permissible that the relays 55, 56 may be attached so as to intervene between the positive electrode bus bar 54a and the positive electrode-side terminals of the first capacitor 50 and the second capacitor 51 and also intervene between the negative electrode bus bar 54b and the negative electrode-side terminals of the first capacitor 50 and the second capacitor 51, and that the relays 57a, 58a, 59a may be attached so as to intervene between the positive electrode bus bar 54a and the positive electrode-side terminals of the inverters 42, 44, 46 of the front wheel-dedicated motors 24, 26 and the motor 36. Or, it is also permissible that the relays 55, 56 may be attached so as to intervene between the positive electrode bus bar 54a and the positive electrode-side terminals of the first capacitor 50 and the second capacitor 51 and also intervene between the negative electrode bus bar 54b and the negative electrode-side terminals of the first capacitor 50 and the second capacitor 51, and that the relays 57a, 58a, 59a may be attached so as to intervene between the negative electrode bus bar 54b and the negative electrode-side terminals of the inverters 42, 44, 46 of the front wheel-dedicated motors 24, 26 and the motor 36.

Although the foregoing embodiment has been described in conjunction with the application to the hybrid motor vehicle 20 developed for racing, the form of the drive device may also be, for example, a drive device mounted in an ordinary hybrid motor vehicle, or a drive device mounted in a vehicle that is not a hybrid motor vehicle, or a drive device that is not mounted in a vehicle.

Besides, the invention may also be provided in a form of a control method for the drive device.

The front wheel-dedicated motors 24, 26 and the motor 36 in the device embodiment may correspond to "at least one electric motor" in the invention. The first capacitor 50 and the second capacitor 51 in the embodiment may correspond to a "plurality of capacitors" in the invention. The relays 55, 56 in the embodiment may correspond to a "plurality of relays for capacitors" in the invention.

The motor ECU 40 in the embodiment that executes the start-up-time process routine shown in FIG. 3 in which, when the warm up of the first capacitor 50 and the second capacitor 51 is needed during the system start-up, firstly the relay 55 provided for the first capacitor 50 is turned on, so that the first capacitor 50 is warmed up as the front wheel-dedicated motors 24, 26 and the motor 36 are driven with the relay 55 on, and in which, after the temperature Tc1 of the first capacitor 50 has reached or exceeded the threshold value Tref2, the relay 55 provided for the first capacitor 50 is turned off, and the relay 56 provided for the second capacitor 51 is turned on, so that the second capacitor 51 is warmed up as the front wheel-dedicated motors 24, 26 and the motor 36, are driven with the relay 56 on, and in which, after the temperature Tc2 of the second capacitor 51 has reached or exceeded the threshold value Tref2, the on-states of the relays 55, 56 provided for the first capacitor 50 and the second capacitor 51 are established, so that the front wheel-dedicated motors 24, 26 and the motor 36 are normally driven, may correspond to a "relay control device" in the invention.

Besides, the engine 32 in the embodiment may correspond to an "internal combustion engine" in the invention. The front wheel-dedicated motors 24, 26 in the embodiment may correspond to a "front wheel-dedicated electric motor" in the invention. The motor 36 in the embodiment may correspond to a "rear wheel-dedicated electric motor" in the invention. The positive electrode bus bar 54a in the embodiment may correspond to a "positive electrode connection member" in the invention. The negative electrode bus bar 54b in the embodiment may correspond to a "negative electrode connection member" in the invention. The relays 43, 45, 47 in the embodiment may correspond to a "plurality of electric motor-dedicated relays" in the invention.

The "at least one electric motor" in the invention is not limited to the front wheel-dedicated motors 24, 26 and the motor 36 that are constructed as synchronous generator-motors, but may also be one electric motor, or two electric motors, or four or more electric motors. The kind of the "at least one electric motor" is not limited to the synchronous generator-motor, either.

The "plurality of capacitors" in the invention is not limited to the first capacitor 50 and the second capacitor 51, but may also be three or more capacitors connected in parallel.

The "plurality of relays for capacitors" in the invention are not limited to the relays 55, 56 that are attached intervening between the positive electrode bus bar 54a and the positive electrode-side terminals of the first capacitor 50 and the second capacitor 51, but may be any relays or the like as long as the relays or the like make electrical connection of the capacitors to the side of the corresponding electric motors and discontinue the electrical connection, such as relays attached so as to intervene between the negative electrode bus bar 54b and the negative electrode-side terminals of the first capacitor 50 and the second capacitor 51, relays attached so as to intervene between the positive electrode bus bar 54a and the positive electrode-side terminals of the first capacitor 50 and the second capacitor 51 and intervene between the negative electrode bus bar 54b and the negative electrode-side terminals of the first capacitor 50 and the second capacitor 51, etc.

The "relay control device" in the invention is not limited to a device which, when the warm up of the first capacitor 50 and the second capacitor 51 is needed during the system start-up, firstly turns on the relay 55 provided for the first capacitor 50, so that the first capacitor 50 is warmed up as the front wheel-dedicated motors 24, 26 and the motor 36 are driven with the relay 55 on, and which, after the temperature Tc1 of the first capacitor 50 has reached or exceeded the threshold value Tref2, turns off the relay 55 provided for the first capacitor 50, and turns on the relay 56 provided for the second capacitor 51, so that the second capacitor 51 is warmed up as the front wheel-dedicated motors 24, 26 and the motor 36 are driven with the relay 56 on, and which, after the temperature Tc2 of the second capacitor 51 has reached or exceeded the threshold value Tref2, establishes the on-states of the relays 55, 56 provided for the first capacitor 50 and the second capacitor 51, so that the front wheel-dedicated motors 24, 26 and the motor 36 are normally driven. The "relay control device" in the invention may be any device as long as the device controls a plurality of relays for capacitors so that, during the system start-up, at least one electric motor is driven in a partially-on-state in which only one or more relays for capacitors, of the plurality of relays for capacitors, are on, and controls the relays for capacitors so that, after a first predetermined condition is satisfied while the at least one electric motor is being driven during the partially-on-state, the at least one electric motor is driven in a remainder-on-state in which the one or more relays for capacitors are off and the one or more remainder relays for capacitors, of the plurality of relays for capacitors, are on, and controls the relays for capacitors so that, after a second predetermined condition is satisfied while the at least one electric motor is being driven in the remainder-on-state, the at least one electric motor is driven in a state in which all the relays for capacitors are on. For example, the "relay control device" in the invention may be a device which, when the warm up of the first capacitor 50 and the second capacitor 51 is needed during the system start-up, firstly turns off the relay 55 provided for the first capacitor 50 and turns on the relay 56 provided for the second capacitor 51, so that the second capacitor 51 is warmed up as the front wheel-dedicated motors 24, 26 and the motor 36 are driven with the relay 56 on, and which, after the temperature Tc2 of the second capacitor 51 has reached or exceeded the threshold value Tref2, turns on the relay 55 provided for the first capacitor 50 and turns off the relay 56 provided for the second capacitor 51, so that the first capacitor 50 is warmed up as the front wheel-dedicated motors 24, 26 and the motor 36 are driven with the relay 55 on, and which, after the temperature Tc1 of the first capacitor 50 has reached or exceeded the threshold value Tref2, establishes the on-states of the relays 55, 56 provided for the first capacitor 50 and the second capacitor 51, so that the front wheel-dedicated motors 24, 26 and the motor 36 are normally driven, and the like.

In the present invention, the first predetermined condition may further include a condition that a difference between the voltage of the part of capacitors corresponding to the part of relays for capacitors and the voltage of the remaining part of capacitors corresponding to the remaining part of relays for capacitors is less than a predetermined first voltage. The second predetermined condition may further include a condition that a difference between the voltage of the part of capacitors corresponding to the part of relays for capacitors and the voltage of the remaining part of capacitors corresponding to the remaining part of relays for capacitors is less than a predetermined second voltage.

In the present invention, the drive device may further include a precharge relay. The relay control device may connect the part of the relays for capacitors, when a difference between the voltage of the capacitor corresponding to the precharge relay and the voltage of the part of capacitors corresponding to the part of relays for capacitors is less than a predetermined third voltage.

In the present invention, the drive device may further include a precharge relay. The relay control device may connect all the plurality of relays for capacitors, when both the temperature of the part of capacitors corresponding to the part of relays for capacitors and the temperature of the remaining capacitors corresponding to the remaining part of relays for capacitors are greater than or equal to a predetermined third temperature when a difference between the voltage of the capacitor corresponding to the precharge relay and the voltage of the part of capacitors corresponding to the part of relays for capacitors is less than a predetermined third voltage.

In the present invention, the internal combustion engine may be mounted so as to output motive power to a rear wheel. The electric motor may be a plurality of electric motors that include a front wheel-dedicated electric motor that outputs motive power to a front wheel, and a rear wheel-dedicated electric motor that outputs motive power to the rear wheel. The plurality of capacitors may be two capacitors including a first capacitor and a second capacitor, and include: a positive electrode connection member connected to anodes of the two capacitors and positive electrode terminals of the plurality of electric motors; a negative electrode connection member connected to cathodes of the two capacitors and connected to negative electrode terminals of the plurality of electric motors; and a plurality of relays for electric motors that connects and disconnects the plurality of electric motors to the positive electrode connection member and the negative electrode connection member. The relay control device may control the plurality of relays for capacitors and the plurality of relays for electric motors so that during the system start-up, the electric motors are driven in the partially-on-state that is a state in which a relay corresponding to the first capacitor and the plurality of relays for electric motors are connected, and controls the plurality of relays for capacitors and the plurality of relays for electric motors so that when the first predetermined condition is satisfied while the plurality of electric motors are being driven in the partially-on-state, the electric motors are driven in the remainder-on-state that is a state in which the relay corresponding to the first capacitor is disconnected and a relay corresponding to the second capacitor and the plurality of relays for electric motors are connected.

In the present invention, each of the plurality of relays for capacitors may be a relay which makes connection and disconnection between the anode or the cathode of one of the two capacitors and one of the connection member of the positive electrode connection member or one of the connection member of the negative electrode connection member that is connected to the anode or the cathode. The plurality of relays for electric motors may be relays each of which makes connection and disconnection between another one of the connection member of the positive electrode connection member or another one of the connection member of the negative electrode connection member that is different from the connection member connected to the anode or the cathode and a terminal of the positive electrode terminal and the negative electrode terminal of the electric motor that is connected to the another one of the connection member.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A drive device having at least one electric motor that receives and outputs motive power, comprising:
   a plurality of capacitors connected parallel to the electric motor and being capable of sending and receiving electric power to and from the electric motor;
   a plurality of relays for capacitors that electrically connects and disconnects the plurality of capacitors to the electric motor; and
   a relay control device that controls the plurality of relays for capacitors,
   wherein the relay control device controls the plurality of relays for capacitors to drive the electric motor in a partially-on-state in which a part of the plurality of relays for capacitors is connected during a system start-up,
   wherein the relay control device controls the plurality of relays for capacitors to drive the electric motor in a remainder-on-state in which the part of the plurality of relays for capacitors is disconnected and a remaining part of the plurality of relays for capacitors is connected after a first predetermined condition is satisfied while the electric motor is being driven in the partially-on-state,
   wherein the first predetermined condition is a condition that a first predetermined time has elapsed, or a condition that a temperature of a part of capacitors corresponding to the part of relays for capacitors is higher than or equal to a first predetermined temperature,
   wherein the relay control device controls the plurality of relays for capacitors to drive the electric motor in a state in which all the plurality of relays for capacitors are connected after a second predetermined condition is satisfied while the electric motor is being driven in the remainder-on-state, and
   wherein the second predetermined condition is a condition that a second predetermined time has elapsed, or a condition that a temperature of a remaining part of capacitors corresponding to the remaining part of relays for capacitors is higher than or equal to a second predetermined temperature.

2. A hybrid vehicle comprising:
   an internal combustion engine that outputs motive power for driving; and
   the drive device according to claim 1,
   wherein the electric motor is mounted so as to be capable of outputting the motive power for driving.

3. The hybrid vehicle according to claim 2, wherein:
   the internal combustion engine is mounted so as to output the motive power for driving to a rear wheel;
   the electric motor is a plurality of electric motors that include a front wheel-dedicated electric motor that outputs the motive power for driving to a front wheel, and a rear wheel-dedicated electric motor that outputs the motive power for driving to the rear wheel;
   the plurality of capacitors are two capacitors including a first capacitor and a second capacitor, and include: a positive electrode connection member connected to positive electrodes of the two capacitors and positive electrode terminals at a side of the plurality of electric motors; a negative electrode connection member connected to negative electrodes of the two capacitors and connected to negative electrode terminals at a side of the plurality of electric motors; and a plurality of relays for electric motors that electrically connects and disconnects the plurality of electric motors to the positive electrode connection member and the negative electrode connection member; and
   the relay control device controls the plurality of relays for capacitors and the plurality of relays for electric motors so that during the system start-up, the electric motors are driven in the partially-on-state that is a state in which a relay corresponding to the first capacitor and the plurality of relays for electric motors are connected, and controls the plurality of relays for capacitors and the plurality of relays for electric motors so that when the first predetermined condition is satisfied while the plurality of electric motors are being driven in the partially-on-state, the electric motors are driven in the remainder-on-state that is a state in which the relay corresponding to the first capacitor is disconnected and a relay corresponding to the second capacitor and the plurality of relays for electric motors are connected.

4. The hybrid vehicle according to claim 3, wherein:
   each of the plurality of relays for capacitors is a relay which makes connection and disconnection between one electrode of the positive electrode and the negative electrode of one of the two capacitors and one connection member of the positive electrode connection member and the negative electrode connection member, which is connected to the one electrode; and
   the plurality of relays for electric motors are relays each of which makes connection and disconnection between another connection member of the positive electrode connection member and the negative electrode connection member, which is different from the one connection member connected to the one electrode, and a terminal of the positive electrode terminal and the negative electrode terminal at the side of the electric motor, which is connected to the other connection member.

5. A control method for a drive device that includes at least one electric motor that receives and outputs motive power, a plurality of capacitors connected parallel to the electric motor and being capable of sending and receiving electric power to and from the electric motor, and a plurality of relays for capacitors that electrically connects and disconnects the plurality of capacitors to the electric motor, the control method comprising:
   controlling the plurality of relays for capacitors to drive the electric motor in a partially-on-state in which a part of the plurality of relays for capacitors is connected during a system start-up;
   controlling the plurality of relays for capacitors to drive the electric motor in a remainder-on-state in which the part of the plurality of relays for capacitors is disconnected and a remaining part of the plurality of relays for capacitors is connected after a first predetermined condition is satisfied while the electric motor is being driven in the partially-on-state, wherein the first predetermined condition is a condition that a first predetermined time has elapsed, or a condition that a temperature of a part of capacitors corresponding to the part of relays for capacitors is higher than or equal to a first predetermined temperature; and controlling the plurality of relays for capacitors to drive the electric motor in a state in which all the plurality of relays are connected after a second predetermined condition is satisfied while the electric motor is being driven in the remainder-on-state, wherein the second predetermined condition is a condition that a second predetermined time has elapsed, or a condition that a temperature of a remaining part of capacitors corresponding to the remaining part of relays for capacitors is higher than or equal to a second predetermined temperature.

* * * * *